Oct. 14, 1924.
H. T. HASKINS
LIQUID TRANSMISSION FOR AUTOMOBILES
Filed Feb. 20, 1922
1,511,333
3 Sheets-Sheet 2

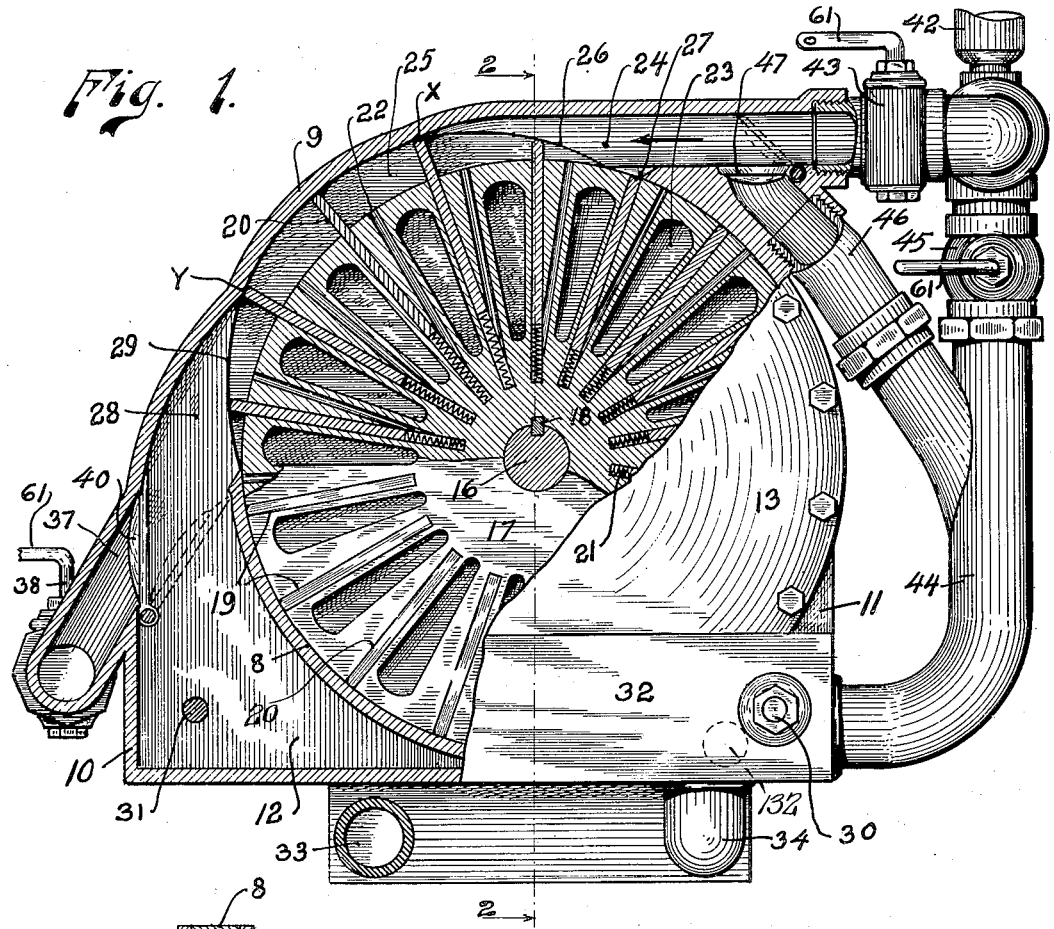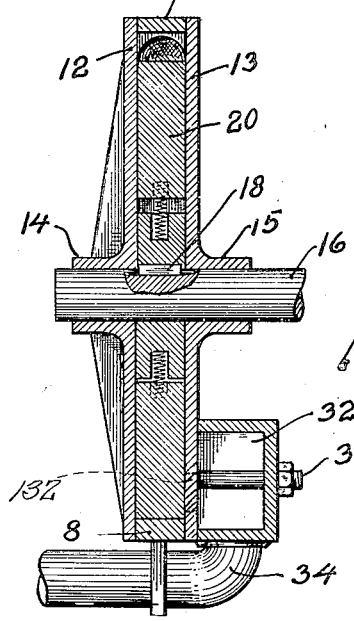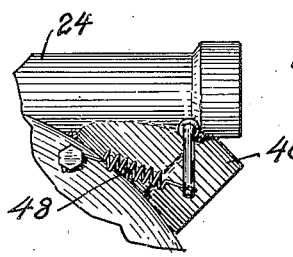

Inventor
Harry T. Haskins.
By A. J. O'Brien
Attorney

Patented Oct. 14, 1924.

1,511,333

UNITED STATES PATENT OFFICE.

HARRY T. HASKINS, OF DENVER, COLORADO, ASSIGNOR OF ONE-HALF TO FRED D. MENDENHALL, OF DENVER, COLORADO.

LIQUID TRANSMISSION FOR AUTOMOBILES.

Application filed February 20, 1922. Serial No. 537,889.

*To all whom it may concern:*

Be it known that I, HARRY T. HASKINS, a citizen of the United States, residing in the city and county of Denver and State of Colorado, have invented certain new and useful Improvements in Liquid Transmission for Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a transmission device adapted for use on automotive vehicles, and in other places where a flexible transmission is desired.

It is well known that the present gear transmission, which is so extensively employed in automotive vehicles, is not as fully satisfactory as it should be. Among the many objections, the following may be mentioned: difficulty in shifting gears, the limited number of gear ratios, or speeds, and the excessive wear and noise.

It is the object of this invention to provide means for transmitting the power of the engine to the wheels, which shall be capable of an unlimited number of different ratios and which shall not require the using of gears. My system, broadly speaking, embodies the idea of employing the power of the engine for operating liquid pumps and then utilizing the liquid for the operation of a specially designed rotary engine, the rotating part of which is connected with the torque shaft of the driving mechanism. The speed can be regulated by means of valves which control the flow of liquid through the rotary engine, all in a manner which will be hereinafter described.

Having now described my apparatus broadly and given the objects thereof, I shall proceed to describe the same in detail, reference being had for the purpose to the accompanying drawing in which—

Fig. 1 is a view, partly in elevation and partly in section, of my improved rotary liquid engine.

Fig. 2 is a section taken on line 2—2 Fig. 1.

Fig. 3 is a fragmentary view showing the manner in which the spring, which serves to open the check valves, is attached.

The same reference numerals will be used to designate the same parts throughout the several views.

Figure 4:
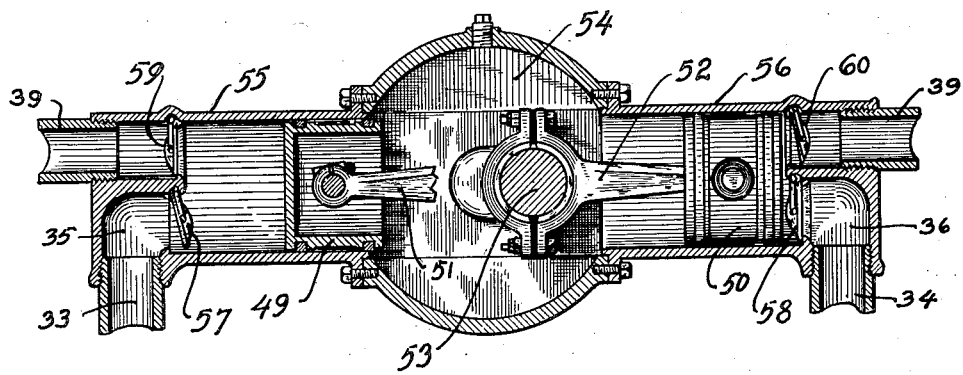
Fig. 4 is a longitudinal vertical section of the pump employed by me.

Numeral 1 represents an automobile chassis of the usual construction and 2 represents the ordinary internal combustion engine while 3 indicates the torque shaft which is provided intermediate its ends with one or more universal joints 4. Engine 2 is directly connected by means of an extension 5, of the crank shaft, with a pump 6, and this is in turn connected by suitable piping with a rotary liquid engine 7, which I shall now describe in detail.

Figure 5:
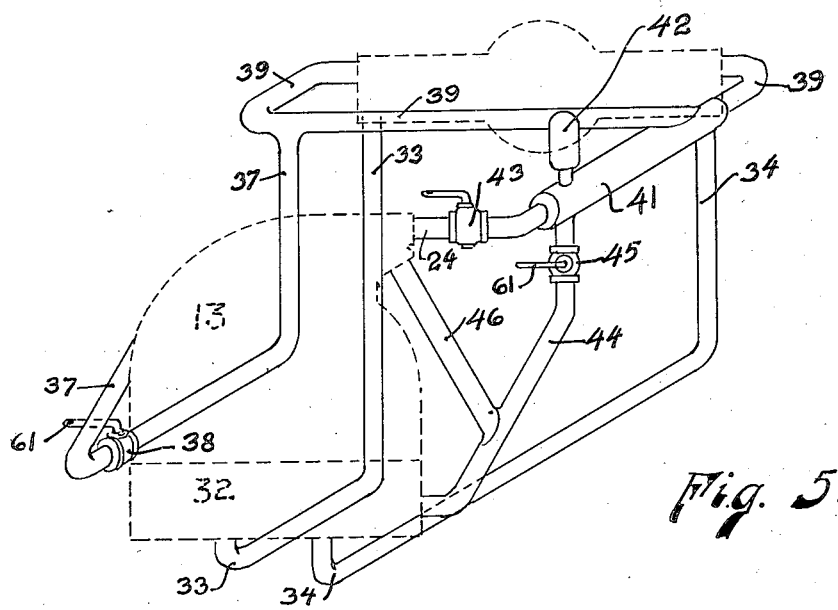
Fig. 5 is a diagram showing the piping connection.

Numeral 8 represents a substantially circular ring which has a portion 9 of its periphery outwardly curved in the manner indicated in Fig. 1. Secured to ring 8, and preferably formed integral therewith is a compartment 10 and connected to it is a similar but smaller compartment 11, both of which serve as receiving compartments for the liquid or oil used for operating the engine. To the front side of ring 8 I bolt a disc or cover 12, and to the rear side I bolt another similar disc or cover 13. Cover 12 is provided with a bearing 14 and cover 13 with a correspondingly placed bearing 15. A shaft 16 is rotatably mounted in bearings 14 and 15 and carries non-rotatably mounted thereon a rotor 17. Rotor 17 is keyed to shaft 16 by a spline 18 and is made of such a thickness that it forms a good sliding fit with the inner surface of covers 12 and 13 (Fig. 2) and of a diameter substantially equal to the inside diameter of ring 8. Rotor 17 is provided with a plurality of equally spaced radial slots 19 within which are slidably mounted plates 20 which are biased outwardly by means of springs 21, and therefore the plates 20 will always have their outer ends in contact with the inner surface of ring 8 and the outwardly curved portion 9 thereof. Extending from the outside periphery of rotor 17 are passages 22 which communicate with slots 19 near their bottom; these passages serve as means for conducting the liquid to the lower end of plates 20 whereby the pressure of the liquid will cooperate with the springs 21 to force the plates 20 outwardly. In order to reduce the weight of the rotor 17 I may cut out the portions indicated by numerals 23, and as the rotor is preferably cast, the holes 23 may be formed at the time of casting. A passageway 24 opens into the curved space 25 which is formed between the inside of the curved wall 9 and the outside of rotor 17. This passageway serves to conduct the liquid to the space 25 where it will cooperate with plates 20 and cause the rotor to move in the manner which will now be described. I provide inclined shoulders 26 on each side of the inner end of passage 24 and these shoulders serve to guide the plates 20 as they are projected outwardly from the slots 19. On the lower side of the inner end of passage 24 I provide a cutaway portion or notch 27 for the purpose of permitting liquid under pressure to enter the passages 22 at the time that the corresponding plate 20 begins its contact with guides 26. That portion of arcuate part 9 between the points marked X and Y is part of a circle which is preferably concentric with the rotor 17 and is preferably of such length that three plates 20 will contact therewith simultaneously, although it can be made so short that only two plates will simultaneously contact therewith. An opening 28 connects space 25 with the receiving compartment 10 and guide shoulders 29 are provided along the inner end of passage 28 for the purpose of moving the plates 20 inwardly in the slots 19. It is evident that if I force a liquid such as oil inwardly through the passage 24, that it will come in contact with the side of the plate 20 which projects beyond the rotor and contacts with the inner surface of the curved portion 9 and move the latter in a counterclockwise direction and cause a corresponding rotation of the rotor 17, the oil or other liquid being finally deposited in the receiving compartments 10 and 11. On the rear of cover disc 13, I secure by means of bolts 30 and 31 a receiving chamber 32 which communicates with chambers 10 and 11 through openings 132 (Fig. 2) in disc 13. From the bottom of chamber 32 pipes 33 and 34 extend to the intake ports 35 and 36 of the pump (Fig. 4). A pipe 37 provided with a valve 38 extends from the chamber 10 to the delivery or pressure line 39. Within chamber 10 I provide a check valve 40 which prevents the liquid from entering pipe 37 from said chamber. Check valve 40 is so proportioned and arranged that it will normally be held in full line position by a spring, similar to spring 48, in the manner indicated in Fig. 3 and will move into dotted line position when fluid is permitted to flow through pipe 37 from the pump to the engine. When valve 40 is in its dotted line position, it forms a seal between passage 28 and the chamber 10. Pipe 37 and valve 40 function only when it is desired to rotate the engine backward in a manner which will be described more in detail hereinafter. A pipe 41 of somewhat larger diameter than pipe 39 connects it with pipe or passage 24. An air chamber 42 (Fig. 5) is connected to pipe 41 for the purpose of taking up the sudden changes in pressure due to the pump in the manner well known and understood. A valve 43 is connected between pipes 41 and 24. Extending from the bottom of pipe 41 to the receiving chamber 32 is a by-pass 44 provided with a valve 45, and joining passage 24 with pipe 44 is a pipe 46 whose upper end is provided with a check valve 47 which is adapted to close the entrance to pipe 46 when the fluid flows through passage 24 in the direction indicated by the arrow in Fig. 1, and which is biased to the dotted line position by means of a spring 48 (Fig. 3).

Figure 6:
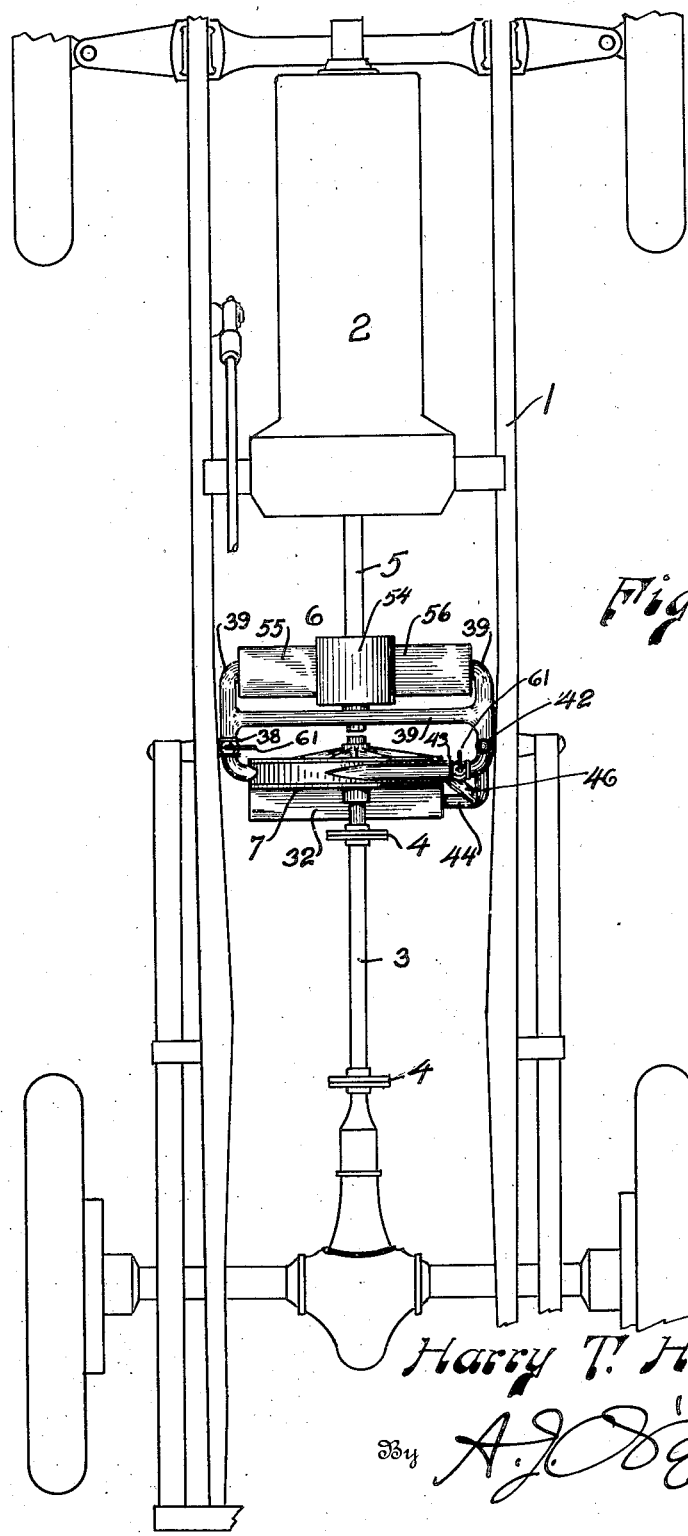
Fig. 6 is a top plan view of an automobile chassis equipped with my liquid transmission.

The pump shown in Fig. 4 is of the double opposed cylinder type having pistons 49 and 50 connected by means of connecting rods 51 and 52 respectively, with the crank pin 53 which rotates in a closed chamber 54 adapted to contain a lubricant. At the ends of portions 55 and 56 are intake valves 57 and 58 and exhaust valves 59 and 60. When the pump is in operation, oil from chamber 32 will be sucked into the cylinders through pipes 33 and 34 and expelled from the pump into pipe 39 from which it will flow through pipe 41 through valve 43 and passage 24 into the chamber 25 of the rotary fluid engine. The oil or liquid flowing in the direction of the arrow through passage 24 will close the check valve 47 and prevent the oil from flowing through pipe 46. As the oil is forced into the engine through passage 24, it will cause the plates 20 to move in a counterclockwise direction. The oil will finally be discharged into the passage 28 and chamber 10 from which it will enter chamber 32 and return to the pump through pipes 33 and 34. From the above, it is readily apparent in what manner the power developed by the internal combustion engine 2 will be transmitted by means of the oil to the rotary liquid engine. In order to change the relative rate of rotation between the engine 2 and the rotary liquid engine, I have provided a valve 45 which controls the by-pass 44. If valve 45 is closed, all of the oil will pass through the passage 24 and through space 25, but if I open the valve 45 to some extent, a portion of the oil will go through the by-pass 44 into chamber 32 without passing through the engine, and the latter will, of course, rotate slower than it would if valve 45 were closed. When valve 45 is wide open, all of the oil will flow through the by-pass and the rotor 17 will remain stationary, even if the pump is running at full speed. In the manner just described, any desired ratio of rotation may be obtained by merely adjusting the valve 45. I have shown valves 38, 43 and 45 as provided with handles 61, suitable for hand operation, but it is my intention to provide means whereby these valves may be operated from the steering wheel or by some conveniently located lever which has not been shown, as it must be specially designed for each separate machine. When it is desired to run the machine backwards, the operator opens valve 38 and closes valve 43; the oil will then pass from pipe 39 downwardly through pipe 37 and enter passage 28 through the check valve 40, which will be moved by the oil into the dotted line position so as to close the entrance to chambers 10 and 32. The oil will then be forced upwardly and through the chamber 25 whereby the rotor 17 will be moved in a clockwise direction. The oil will then flow into passage 24 in a direction opposite to that indicated by the arrow. When valve 38 is closed, a spring similar to spring 48 and connected to the valve 40 in the same manner as spring 48 is connected to valve 47, will return it to full line position. The check valve 47 will be moved into the dotted line position and permit the oil to flow downwardly into chamber 32 through pipes 46 and 44. The speed at which the backing takes place can be controlled by means of valve 45 in the same manner as when the machine is drawn in a forward direction. My pump and rotary liquid engine are secured to the automobile chassis in the location shown in Fig. 6 by means of suitable hangers which have not been shown.

I have shown and described a pump which I consider to be well adapted for the use, but it is evident that almost any type of pump can be employed and I desire that my disclosure in regard to the same shall be considered in an illustrative sense only.

From the above description, it is apparent that I have devised a liquid transmission which is especially well adapted to be applied to an automobile of any ordinary construction and by means of which the power developed by the engine can be transmitted to the wheels of the vehicle at a high efficiency, and which at the same time is capable of an almost infinite number of speed ratios, both in the forward and the reverse direction.

Having now described my invention, what I claim as new is—

1. In combination, a pump provided with intake and delivery ports, a rotary engine adapted to be operated by liquid under pressure and provided with intake and exhaust ports, a passageway between the delivery ports of the pump and the intake port of said engine, a second passageway between the exhaust port of said engine and the intake ports of said pump, a by-pass joining said passageways, a valve in said first mentioned passageway between said by-pass and the intake port of the engine, a valve controlling the opening through said by-pass, a pipe opening into said first mentioned passageway between the valve therein and the intake port of the engine, said pipe opening into said by-pass between the valve therein and the second named passageway, a check valve in said pipe, a passageway connecting the delivery ports of the pump to the exhaust port of the engine and a valve in said passageway.

2. In combination a pump having intake and delivery ports, a rotary engine adapted to be operated by a liquid under pressure; said engine having a rotor, an intake port, an exhaust port and a chamber for receiving the liquid after it has passed through the engine, a passageway between the delivery ports of the pump and the intake port of the engine, passageways joining the intake ports of the pump and the receiving chamber of the engine, a by-pass connecting the passageways, a valve in the first mentioned passageway between the by-pass connection and the intake port of the engine, a valve in said by-pass for controlling the same, a pipe extending from the first passageway at a point between the valve therein and the intake port of the engine to the receiving chamber, a check valve within the intake port of the engine and adapted to close the end of said pipe when liquid flows into the intake port and to open said pipe and close the first mentioned passageway when the liquid flows from the intake port of the engine, a pipe connecting the first mentioned passageway with the exhaust port of the engine, a valve in said last named pipe and a check valve in the exhaust port of the engine, said last named checkvalve being adapted to close the end of said last named pipe against entry thereinto of liquid from the exhaust port and to close the passageway between said exhaust port and the receiving chamber when liquid flows from the first mentioned passageway through the last mentioned pipe and into the exhaust port.

In testimony whereof I affix my signature.

HARRY T. HASKINS.